H. Waterman,
Steam Safety Valve.
No. 2,675.
Reissued July 9, 1867.
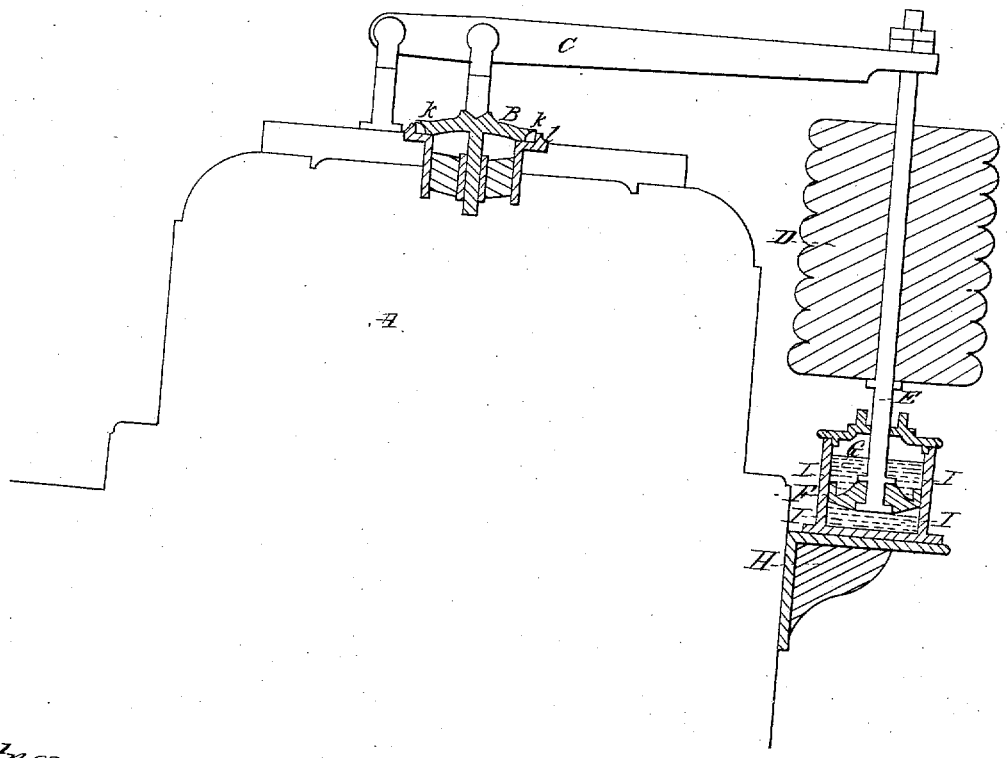
Witnesses
Geo W Richardson
L. H. Poore
Inventor
Henry Waterman
AM. PHOTO-LITHO. CO. N.Y. (OSBORNE'S PROCESS.)

United States Patent Office.

HENRY WATERMAN, OF HUDSON, NEW YORK.

*Letters Patent No.* 10,243, *dated November* 15, 1853; *reissue No.* 2,675, *dated July* 9, 1867.

IMPROVEMENT IN SAFETY-VALVES.

The Schedule referred to in these Letters Patent and making part of the same.

TO ALL WHOM IT MAY CONCERN:

Be it known that I, HENRY WATERMAN, of Hudson, in the county of Columbia, in the State of New York, have invented a new and useful Improvement on the Safety-Valve for Steam-Generators; and I do hereby declare that the following is a full, clear, and exact description of the construction and operation of the same, reference being had to the annexed drawings, making a part of this specification, in which—

A represents a vertical section of part of the boiler.

B represents a vertical section of the valve.

C, the ordinary lever.

D, the weight.

E, the rod upon which the weight is suspended.

F, the piston attached to the rod E.

G, the cylinder in which the piston F moves freely.

H is a stand, by means of which the cylinder is attached to the boiler or other permanent support.

I I I I represent the fluid in the cylinder G which covers the piston F.

*k k* represent the overhanging part of the valve, which increases its area outside of and beyond the ground joint.

*l l* represent a concentric rim or ledge that directs the steam upwards against the overhanging part *k k*, by means of which the valve is assisted in rising.

In the ordinary safety-valve of steam-generators, it has long been known that there existed a strong inclination or attraction between the valve and the seat, other than that produced by the superincumbent weight or force; or, in other words, when the valve is loaded, so that steam shall commence to escape from the generator at a given density or pressure of the steam, it requires a greatly increased force against the valve to raise it to a distance from the seat that will allow any near approach to the full capacity of the valve for effecting the escape of steam. This is true when the superincumbent force is constant, as in the case when a weight is used; it is still more forcibly felt when the superincumbent force is a spring, as is the case in all locomotive engines, for the reason that the force of the spring increases as it is moved. I construct the safty-valve of steam-generators so that the aforementioned dispcsition shall be counteracted, and its evil effects entirely prevented. I desire to use a weight, whenever it is possible, for the reason that the force due to its gravity is constant. The weight is generally used with the generators of stationary and steamboat engines. In the case of locomotive engines, however, their jolting, when in motion, causes the valve (when a weight is used) to jump up from its seat before the steam has attained sufficient density or pressure to raise it. To counteract this jolting, jumping tendency, I attach to the weight a piston, working in a liquid dash-pot. This will only prevent the jolting tendency, however. Another contrivance is necessary to counteract the disposition of the valve to stick or be attracted to the seat. For this purpose I construct the valve and seat so that the escaping steam shall act upon an increased area of the valve after it has raised from its seat, or, in other words, so that, when the valve has raised from its seat, the escaping steam is so directed that its force strikes an overhanging or projecting annular surface on the top of the valve, and outside of and beyond the ground-joint. Thus, in the drawing, *k k* indicates this overhanging or projecting annular surface, while *l l* indicates a concentric rim or ledge, so constructed as to turn the force of the escaping steam against *k k*. This force may be modified by a proper modification of the overhanging or projecting annular surface; thus, if the overhanging surface be large, the force of the steam will suddenly open the valve and discharge so much steam that the pressure in the generator will be considerably reduced before the valve closes. This overhanging surface *k k* may, however, be made so small that but little more than the surplus steam actually generated will escape. In either case, besides overcoming the sticking or attraction of the valve to the seat, this most desirable object will be attained, to wit: the steam pressure in the generator will not rise a particle above the initial point of escaping. The peculiarity of this form of valve is this, that while it prevents the steam from rising above the initial point of blowing, the valve will remain open until the pressure is reduced below the initial point of blowing before it will be allowed to close, the success or efficiency of it must depend upon a proper proportion of the parts *k k* and *l l;* thus, if those parts are of large proportion and the steam allowed a free discharge between them, it will not at all assist the valve in rising. Again, if they are made too large and the escape between them be too small, it will cause the valve to rise too easily and remain open too long, so that the steam will be so much reduced in pressure as seriously to impair their economical and efficient condition. It has been found, in practice, for instance, that in case of a safety-valve, such as is usually used in the locomotive engines, of about two and a half inches in diameter, with a pressure of steam about one hundred and thirty pounds per square inch, if the overhanging part *k k* is made of a diameter of about one-sixth of an inch, on each side, larger than the valve proper, and the ledge or rim *l l* is made of a diameter about one-sixteenth, on each side, larger than *k k*, so as to leave an opening of about one-sixteenth of an inch in space between the parts *k k* and *l l*, and the part *k k* is made to sink down into the cavity formed by the parts *l l* about one-sixteenth of an inch, the valve will rise, and will discharge the steam freely, until the pressure is reduced about three pounds per inch below the initial point of blowing, which I consider a most desirable and efficient operation; these being the proportions when the pressure is used of different density, until a small margin of difference is obtained between the opening point of pressure and the closing. Thus it will be seen that when it is ascertained that the generator has sufficient strength to bear with perfect safety a given load or pressure, the use of this valve will not allow the pressure to exceed that point, when the valve has been gauged to said point. Boiler explosions, caused by excessive pressure, will therefore be entirely prevented, and boiler leakage, caused by great variations of pressure and temperature, will also be prevented.

The operation of this contrivance is as follows: As before stated, I prefer, in order to attain a most perfect action, to use as a superincumbent force a weight which will put upon the valve a steady, uniform force, which will not increase as it is raised; and to counteract any jolting tendency, I use the piston F, working in the cylinder G, immersed in the I I I I. It is evident that the piston cannot move in the cylinder without requiring the fluid to pass from one side of the piston to the other. I make the piston sufficiently small, so that it will not only move without touching the sides of the cylinder, but will allow the fluid to pass slowly, yet freely. Thus it will be seen that the piston will move slowly to its proper position, avoiding any sudden motion caused by jar or jolting. Then when the steam has been raised to a point that, by its pressure upon the lower side of that portion of the valve within the area of the opening through the seat, it is enabled to raise the superincumbent weight, it will allow the steam to escape. This escaping steam is then, by the concentric rim or ledge *l l*, directed upward against the enlarged area of the valve made by the overhanging part *k k*, the comparative size of which must be such, and the size of the orifice made by the approach of the parts *k k* and the parts *l l* must also be such, as to form a sufficient retardment of the escaping steam, or just sufficiently to raise the valve and counteract the sticking tendency of the valve before mentioned, for, as before mentioned, when the valve is assisted too much by the improper proportion of these parts, the valve will stay open too long, the steam will escape until it will be too much reduced in pressure. This action will defeat the object I have in view, which is to keep the pressure of the steam as near as possible the initial point of blowing, and not allow it to go above that point, and not to escape materially below it.

What I claim as my invention, and desire to secure by Letters Patent, is—

1. The piston F, attached to the weighted end of the valve-lever, within the cylinder G, and immersed in the liquid in the cylinder, combined and operating in the manner and for the purpose herein described.

2. I also claim the concentric rim or ledge *l l* and the overhanging part of valve *k k*, constructed, combined, and operating in the manner and for the purpose herein set forth.

HENRY WATERMAN.

Witnesses:

GEO. W. RICHARDSON,
W. H. POOR.